US007389230B1

(12) United States Patent
Nelken

(10) Patent No.: US 7,389,230 B1
(45) Date of Patent: Jun. 17, 2008

(54) SYSTEM AND METHOD FOR CLASSIFICATION OF VOICE SIGNALS

(75) Inventor: Israel Nelken, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 860 days.

(21) Appl. No.: 10/421,356

(22) Filed: Apr. 22, 2003

(51) Int. Cl.
G10L 15/00 (2006.01)
G10L 15/02 (2006.01)
G10L 15/14 (2006.01)

(52) U.S. Cl. ........................................ 704/255; 704/240
(58) Field of Classification Search ........................ None
See application file for complete search history.

(56) References Cited

U.S. PATENT DOCUMENTS

| | | | |
|---|---|---|---|
| 3,648,253 A | 3/1972 | Mullery |
| 4,286,322 A | 8/1981 | Hoffman et al. |
| 4,642,756 A | 2/1987 | Sherrod |
| 4,658,370 A | 4/1987 | Erman et al. |
| 4,805,107 A | 2/1989 | Kleckhafer et al. |
| 4,814,974 A | 3/1989 | Narayanan et al. |
| 4,817,027 A | 3/1989 | Plum et al. |
| 4,908,865 A | 3/1990 | Doddington et al. |
| 4,918,735 A | 4/1990 | Morito et al. |
| 4,942,527 A | 7/1990 | Schumacher |
| 5,018,215 A | 5/1991 | Nasr et al. |
| 5,040,141 A | 8/1991 | Yazima et al. |
| 5,051,924 A | 9/1991 | Bergeron et al. |
| 5,067,099 A | 11/1991 | McCown et al. |
| 5,068,789 A | 11/1991 | van Vliembergen |
| 5,099,425 A | 3/1992 | Yuji et al. |
| 5,101,349 A | 3/1992 | Tokuume et al. |
| 5,118,105 A | 6/1992 | Brim |
| 5,125,024 A | 6/1992 | Gokcen et al. |
| 5,210,872 A | 5/1993 | Ferguson et al. |
| 5,228,116 A | 7/1993 | Harris et al. |
| 5,230,054 A | 7/1993 | Tamura |
| 5,247,677 A | 9/1993 | Welland et al. |
| 5,251,131 A | 10/1993 | Masand et al. |

(Continued)

FOREIGN PATENT DOCUMENTS

CA 2180392 2/2001

(Continued)

OTHER PUBLICATIONS

Mori, S. "Class based variable memory length Markov model" Transactions of Information Processing Society of Japan, Jan. 2002, vol. 43, pp. 34-43.*

(Continued)

*Primary Examiner*—David Hudspeth
*Assistant Examiner*—Matthew J Sked
(74) *Attorney, Agent, or Firm*—Gates & Cooper LLP

(57) ABSTRACT

A system and method for classifying a voice signal to one of a set of predefined categories, based upon a statistical analysis of features extracted from the voice signal. The system includes an acoustic processor and a classifier. The acoustic processor extracts features that are characteristic of the voice signal and generates feature vectors using the extracted spectral features. The classifier uses the feature vectors to compute the probability that the voice signal belongs to each of the predefined categories and classifies the voice signal to a predefined category that is associated with the highest probability.

15 Claims, 8 Drawing Sheets

U.S. PATENT DOCUMENTS

| | | | |
|---|---|---|---|
| 5,265,033 A | 11/1993 | Vajk et al. | |
| 5,278,942 A | 1/1994 | Bahl et al. | |
| 5,287,430 A | 2/1994 | Iwamoto et al. | |
| 5,311,583 A | 5/1994 | Friedes et al. | |
| 5,321,608 A | 6/1994 | Namba et al. | |
| 5,325,526 A | 6/1994 | Cameron et al. | |
| 5,345,501 A | 9/1994 | Shelton | |
| 5,369,570 A | 11/1994 | Parad | |
| 5,371,807 A | 12/1994 | Register et al. | |
| 5,377,354 A | 12/1994 | Scannell et al. | |
| 5,437,032 A | 7/1995 | Wolf et al. | |
| 5,444,820 A | 8/1995 | Tzes et al. | |
| 5,483,466 A | 1/1996 | Kawahara et al. | |
| 5,487,100 A | 1/1996 | Kane | |
| 5,493,677 A | 2/1996 | Balogh et al. | |
| 5,493,692 A | 2/1996 | Theimer et al. | |
| 5,502,790 A * | 3/1996 | Yi | 704/256 |
| 5,522,026 A | 5/1996 | Records et al. | |
| 5,526,521 A | 6/1996 | Fitch et al. | |
| 5,542,088 A | 7/1996 | Jennings, Jr. et al. | |
| 5,555,344 A | 9/1996 | Zunkler | |
| 5,559,710 A | 9/1996 | Shahraray et al. | |
| 5,566,171 A | 10/1996 | Levinson | |
| 5,574,933 A | 11/1996 | Horst | |
| 5,596,502 A | 1/1997 | Koski et al. | |
| 5,615,299 A * | 3/1997 | Bahl et al. | 704/254 |
| 5,630,128 A | 5/1997 | Farrell et al. | |
| 5,636,124 A | 6/1997 | Rischar et al. | |
| 5,664,061 A | 9/1997 | Andreshak et al. | |
| 5,687,384 A | 11/1997 | Nagase | |
| 5,694,616 A | 12/1997 | Johnson et al. | |
| 5,701,400 A | 12/1997 | Amado | |
| 5,706,399 A | 1/1998 | Bareis | |
| 5,715,371 A | 2/1998 | Ahamed et al. | |
| 5,721,770 A | 2/1998 | Kohler | |
| 5,724,481 A | 3/1998 | Garberg et al. | |
| 5,745,652 A | 4/1998 | Bigus | |
| 5,745,736 A | 4/1998 | Picart | |
| 5,754,671 A | 5/1998 | Higgins et al. | |
| 5,761,631 A | 6/1998 | Nasukawa | |
| 5,765,033 A | 6/1998 | Miloslavsky | |
| 5,794,194 A | 8/1998 | Takebayashi et al. | |
| 5,806,040 A | 9/1998 | Vensko | |
| 5,809,462 A | 9/1998 | Nussbaum | |
| 5,809,464 A | 9/1998 | Kopp et al. | |
| 5,811,706 A | 9/1998 | Van Buskirk et al. | |
| 5,822,745 A | 10/1998 | Hekmatpour | |
| 5,832,220 A | 11/1998 | Johnson et al. | |
| 5,835,682 A | 11/1998 | Broomhead et al. | |
| 5,845,246 A | 12/1998 | Schalk | |
| 5,850,219 A | 12/1998 | Kumomura | |
| 5,860,059 A | 1/1999 | Aust et al. | |
| 5,864,848 A | 1/1999 | Horvitz et al. | |
| 5,867,495 A | 2/1999 | Elliott et al. | |
| 5,878,385 A | 3/1999 | Bralich et al. | |
| 5,878,386 A | 3/1999 | Coughlin | |
| 5,884,302 A | 3/1999 | Ho | |
| 5,890,142 A | 3/1999 | Tanimura et al. | |
| 5,895,447 A | 4/1999 | Ittycheriah et al. | |
| 5,899,971 A | 5/1999 | De Vos | |
| 5,920,835 A | 7/1999 | Huzenlaub et al. | |
| 5,940,612 A | 8/1999 | Brady et al. | |
| 5,944,778 A | 8/1999 | Takeuchi et al. | |
| 5,946,388 A | 8/1999 | Walker et al. | |
| 5,948,058 A | 9/1999 | Kudoh et al. | |
| 5,960,393 A | 9/1999 | Cohrs et al. | |
| 5,963,447 A | 10/1999 | Kohn et al. | |
| 5,974,385 A | 10/1999 | Ponting et al. | |
| 5,974,465 A | 10/1999 | Wong | |
| 5,995,513 A | 11/1999 | Harrand et al. | |
| 5,999,932 A | 12/1999 | Paul | |
| 5,999,990 A | 12/1999 | Sharrit et al. | |
| 6,006,221 A | 12/1999 | Liddy et al. | |
| 6,258,773 B1 | 12/1999 | Liddy et al. | |
| 6,021,403 A | 2/2000 | Horvitz et al. | |
| 6,035,104 A | 3/2000 | Zahariev | |
| 6,038,535 A | 3/2000 | Campbell | |
| 6,058,389 A | 5/2000 | Chandra et al. | |
| 6,061,667 A | 5/2000 | Danford-Klein et al. | |
| 6,061,709 A | 5/2000 | Bronte | |
| 6,064,971 A | 5/2000 | Hartnett | |
| 6,067,565 A | 5/2000 | Horvitz | |
| 6,070,149 A | 5/2000 | Tavor et al. | |
| 6,493,694 B1 | 5/2000 | Tavor et al. | |
| 6,073,101 A | 6/2000 | Maes | |
| 6,085,159 A | 7/2000 | Ortega et al. | |
| 6,092,042 A | 7/2000 | Iso | |
| 6,092,095 A | 7/2000 | Maytal | |
| 6,098,047 A | 8/2000 | Oku et al. | |
| 6,112,126 A | 8/2000 | Hales et al. | |
| 6,115,734 A | 9/2000 | Mansion | |
| 6,138,139 A | 10/2000 | Beck et al. | |
| 6,144,940 A | 11/2000 | Nishi et al. | |
| 6,148,322 A | 11/2000 | Sand et al. | |
| 6,151,538 A | 11/2000 | Bate et al. | |
| 6,161,094 A | 12/2000 | Adcock et al. | |
| 6,161,130 A | 12/2000 | Horvitz et al. | |
| 6,182,036 B1 | 1/2001 | Poppert | |
| 6,182,059 B1 | 1/2001 | Angotti et al. | |
| 6,182,120 B1 | 1/2001 | Beaulieu et al. | |
| 6,185,603 B1 | 2/2001 | Henderson et al. | |
| 6,199,103 B1 | 3/2001 | Sakaguchi et al. | |
| 6,203,495 B1 | 3/2001 | Bardy | |
| 6,212,544 B1 | 4/2001 | Borkenhagen et al. | |
| 6,223,201 B1 | 4/2001 | Reznak | |
| 6,226,630 B1 | 5/2001 | Bilmers | |
| 6,243,735 B1 | 6/2001 | Imanishi et al. | |
| 6,253,188 B1 | 6/2001 | Witek et al. | |
| 6,260,058 B1 | 7/2001 | Hoenninger et al. | |
| 6,282,565 B1 | 8/2001 | Shaw et al. | |
| 6,301,602 B1 | 10/2001 | Ueki | |
| 6,308,197 B1 | 10/2001 | Mason et al. | |
| 6,314,446 B1 | 11/2001 | Stiles | |
| 6,327,581 B1 | 12/2001 | Platt | |
| 6,353,667 B1 | 3/2002 | Foster et al. | |
| 6,360,243 B1 | 3/2002 | Lindsley et al. | |
| 6,370,526 B1 | 4/2002 | Agrawal et al. | |
| 6,374,219 B1 * | 4/2002 | Jiang | 704/255 |
| 6,374,221 B1 * | 4/2002 | Haimi-Cohen | 704/256.1 |
| 6,377,949 B1 | 4/2002 | Gilmour | |
| 6,408,277 B1 | 6/2002 | Nelken | |
| 6,411,947 B1 | 6/2002 | Rice et al. | |
| 6,411,982 B2 | 6/2002 | Williams | |
| 6,418,458 B1 | 7/2002 | Maresco | |
| 6,421,066 B1 | 7/2002 | Sivan | |
| 6,424,995 B1 | 7/2002 | Shuman | |
| 6,424,997 B1 | 7/2002 | Buskirk, Jr. et al. | |
| 6,430,615 B1 | 8/2002 | Hellerstein et al. | |
| 6,434,435 B1 | 8/2002 | Tubel et al. | |
| 6,442,542 B1 | 8/2002 | Ramani et al. | |
| 6,442,589 B1 | 8/2002 | Takahashi et al. | |
| 6,446,061 B1 | 9/2002 | Doerre et al. | |
| 6,449,646 B1 | 9/2002 | Sikora et al. | |
| 6,460,074 B1 | 10/2002 | Fishkin | |
| 6,477,500 B2 * | 11/2002 | Maes | 704/275 |
| 6,477,580 B1 | 11/2002 | Bowman-Amuah | |
| 6,490,572 B2 | 12/2002 | Akkiraju et al. | |
| 6,496,836 B1 | 12/2002 | Ronchi | |
| 6,496,853 B1 | 12/2002 | Klein | |
| 6,507,872 B1 | 1/2003 | Geshwind | |
| 6,513,026 B1 | 1/2003 | Horvitz et al. | |
| 6,535,795 B1 | 3/2003 | Schroeder et al. | |
| 6,560,330 B2 | 5/2003 | Gabriel | |
| 6,571,282 B1 | 5/2003 | Bowman-Amuah | |

| | | | |
|---|---|---|---|
| 6,594,697 | B1 | 7/2003 | Praitis et al. |
| 6,611,535 | B2 | 8/2003 | Ljungqvist |
| 6,615,172 | B1 | 9/2003 | Bennett et al. |
| 6,618,727 | B1 | 9/2003 | Wheeler et al. |
| 6,654,726 | B1 | 11/2003 | Hanzek |
| 6,654,815 | B1 | 11/2003 | Goss et al. |
| 6,714,643 | B1 | 3/2004 | Gareya et al. |
| 6,738,759 | B1 | 5/2004 | Wheeler et al. |
| 6,742,015 | B1 | 5/2004 | Bowman-Amuah |
| 6,744,878 | B1 | 6/2004 | Komissarchik et al. |
| 6,747,970 | B1 | 6/2004 | Lamb et al. |
| 6,748,387 | B2 | 6/2004 | Garber et al. |
| 6,850,513 | B1 | 2/2005 | Pelissier |
| 6,868,065 | B1 | 3/2005 | Kloth et al. |
| 6,879,586 | B2 | 4/2005 | Miloslavsky et al. |
| 6,915,344 | B1 | 7/2005 | Rowe et al. |
| 2001/0022558 | A1 | 9/2001 | Karr |
| 2001/0027463 | A1 | 10/2001 | Kobayashi |
| 2001/0042090 | A1 | 11/2001 | Williams |
| 2001/0056456 | A1 | 12/2001 | Cota-Robles |
| 2002/0032715 | A1 | 3/2002 | Utsumi |
| 2002/0052907 | A1 | 5/2002 | Wakai et al. |
| 2002/0065953 | A1 | 5/2002 | Alford et al. |
| 2002/0073129 | A1 | 6/2002 | Wang et al. |
| 2002/0078119 | A1 | 6/2002 | Brenner et al. |
| 2002/0078121 | A1 | 6/2002 | Ballantyne |
| 2002/0078257 | A1 | 6/2002 | Nishimura |
| 2002/0082829 | A1* | 6/2002 | Jiang et al. ................... 704/226 |
| 2002/0083251 | A1 | 6/2002 | Chauvel et al. |
| 2002/0087618 | A1 | 7/2002 | Bohm et al. |
| 2002/0087623 | A1 | 7/2002 | Eatough |
| 2002/0091746 | A1 | 7/2002 | Umberger et al. |
| 2002/0099714 | A1 | 7/2002 | Murray |
| 2002/0103871 | A1 | 8/2002 | Pustejovsky |
| 2002/0107926 | A1 | 8/2002 | Lee |
| 2002/0116463 | A1 | 8/2002 | Hart |
| 2002/0150966 | A1 | 10/2002 | Muraca |
| 2002/0154645 | A1 | 10/2002 | Hu et al. |
| 2002/0196911 | A1* | 12/2002 | Gao et al. ................ 379/88.03 |
| 2003/0046297 | A1 | 3/2003 | Mason |

FOREIGN PATENT DOCUMENTS

| | | |
|---|---|---|
| EP | 0 597 630 | 5/1994 |
| EP | 0 304 191 | 2/1999 |
| JP | 09106296 | 4/1997 |
| WO | 00/036487 | 6/2000 |
| WO | 01/084373 | 8/2001 |
| WO | 01/084374 | 8/2001 |

OTHER PUBLICATIONS

Chien, L. Lin, S, Hong, J. Chen, M. Wang, H. Shen, J. Chen, K. Lee, L. Internet Chinese Information Retrieval Using Unconstrained Mandarin Speech Queries Based on a Client-Server Architecture and a PAT-tree-based Language, Acoustics, Speech and Signal Processing, vol. 2, pp. 1155-1158, 1997.*

Hawkins et al, "The Evolution of the Call Center to the 'Customer Contact Center,'" ITSC White Paper, Feb. 2001.

Firepond eService Provider,http://www.firepond.com/products/eserviceperformer.

Definintion—Definition of Contact Center ,http://www.Searchcrm.techtarget.com/s.

Hawkins et al., "Transforming Your Call Center Into a Contact Center: Where Are You? Trends and Recommendations," An IDC Executive Brief (#33). Adapated from: Worldwide CRM Applications Market Forecast and Analysis Summary, 2001-2005, IDC #24750, Jun. 2001.

Banter White Paper:, "Natural Language Engines or Advanced Customer Interaction," by Banter Inc.

Webster's Third New International Dictionary, G&C Meriam Company, 1961, pp. 538, 834, 1460.

Computer Dictionary, Third Edition, Microsoft Press, 1997, pp. 192.

Breese et al., "Empirical Analysis of Predictive Algorithms for Collaborative Filtering," Proc. of the 14th Conf. on Uncertainty in Artificial Intelligence, Jul. 1998.

Czerwinski et al., "Visualizing Implicit Queries for Information Management and Retrieval," Proc. of CHI 1999, ACM SIGHCHI Conf. on Human Factors in Computing Systems, 1999.

Dumais et al., Inductive Learning Algorithms and Representations for Task Categorization, Proc. of 7th Int'l. Conf. on Information & Knowledge Management, 1998.

Horvitz et al., "Principles of Mixed-Initiative User Interfaces," Proc. of CHI 1999, ACM SIGHCHI Conf. on Human Factors in Computing Systems, 1999.

Horvitz et al., "Display of Information for Time-Critical Decision Making," Proc. of 11th Conf. on Uncertainty in Artificial Intelligence, Jul. 1995.

Horvitz et al., "The Lumiere Project: Bayesian User Modeling . . . ," Proc. of the 14th Conf. on Uncertainty in Artificial Intelligence, Jul. 1998.

Horvitz et al., "Time-Dependent Utility and Action Under Uncertainty," Proc. of the 7th Conf. on Uncertainty in Artificial Intelligence, Jul. 1991.

Horvitz et al., "Time-Critical Action: Representations and Application," Proc. of the 13th Conf. on Uncertainty in Artificial Intelligence, Jul. 1997.

Koller et al., "Toward Optimal Feature Selection," Proc. of 13th Conf. on Machine Learning, 1996.

Lieberman, "Letizia: An Agent that Assists in Web Browsing," Proc. of International Joint Conference on Artificial Intelligence, 1995.

Platt, "Fast Training of Support Vector Machines Using Sequential Minimal Optimization, Advances in Kernel Methods: Support Vector Learning," MIT Press, Cambridge MA, 1999.

Platt, "Probabilistic Outputs for Support Vector Machines & Comparisons to Regularized Likelihood Methods," Adv. in Large Margin Classifiers, MIT Press, Cambridge MA, 1999.

Sahami et al., "A Bayesian Approach to Filtering Junk E-Mail," Amer. Assoc.for Art. Intell. Technical Report WS-98-05, 1998.

Cohen, "Learning Rules that Classify E-Mail," AT&T Laboratories, 1996.

Lewis, Evaluating and Optimizing Autonomous Text Classification Systems, ACM SIGIR, 1995.

Lewis et al., "Training Algorithms for Linear Text Classifiers," ACM SIGIR, 1996.

Apte et al., "Automated Learning of Decision Rules for Text Categorization," ACM Transactions on Information Systems, vol. 12, No. 3, 1994.

Losse, Jr., "Minimizing Information Overload: The Ranking of Electronic Messages," Journal of Information Sciences 15, 1989.

Joachimes, "Text Categorization with Support Vector Machines: Learning with Many Relevant Features," Universal Dortmund, Germany, 1998.

Morelli et al., "Predicting Technical Communication in Product Development Organizations," IEEE Transactions on Engineering Management, vol. 42, issue 3, Aug. 1995.

Paramentier et al., Logical Structure Recognition of Scientific Bibliographic References, 4th Int'l Conference on Document Analysis & Recognition, vol. 2, Aug. 18-20, 1997.

Kalogeraki et al., "Using Multiple Feedback Loops for Object Profiling . . . ," IEEE Int'l Symposium on Object-Oriented Real-Time Distributed Computing, May 2-5, 1999.

Johnson et al., "Adaptive Model-Based Neural Network Control," IEEE Int'l Conference on Robotics and Automation, May 13-18, 1990.

\* cited by examiner

SYSTEM AND METHOD FOR CLASSIFICATION OF VOICE SIGNALS

BACKGROUND OF THE INVENTION

1. Field of the Invention

This invention relates generally to electronic voice processing systems, and relates more particularly to a system and method for voice signal classification based on statistical regularities in voice signals.

2. Description of the Background Art

Speech recognition systems may be used for interaction with a computer or other device. Speech recognition systems usually translate a voice signal into a text string that corresponds to instructions for the device. FIG. 1 is a block diagram of a speech recognition system of the prior art. The speech recognition system includes a microphone 110, an analog-to-digital (A/D) converter 115, a feature extractor 120, a speech recognizer 125, and a text string 130. Microphone 110 receives sound energy via pressure waves (not shown). Microphone 110 converts the sound energy to an electronic analog voice signal and sends the analog voice signal to A/D converter 115. A/D converter 115 samples and quantizes the analog signal, converting the analog voice signal to a digital voice signal. Typical sampling frequencies are 8 KHz and 16 KHz. A/D converter 115 then sends the digital voice signal to feature extractor 120. Typically, feature extractor 120 segments the digital voice signal into consecutive data units called frames, and then extracts features that are characteristic to the voice signal of each frame. Typical frame lengths are ten, fifteen, or twenty milliseconds. Feature extractor 120 performs various operations on the voice signal of each frame. Operations may include transformation into a spectral representation by mapping the voice signal from time to frequency domain via a Fourier transform, suppressing noise in the spectral representation, converting the spectral representation to a spectral energy or power signal, and performing a second Fourier transform on the spectral energy or power signal to obtain cepstral coefficients. The cepstral coefficients represent characteristic spectral features of the voice signal. Typically, feature extractor 120 generates a set of feature vectors whose components are the cepstral coefficients. Feature extractor 120 sends the feature vectors to speech recognizer 125. Speech recognizer 125 includes speech models and performs a speech recognition procedure on the received feature vectors to generate the text string 130. For example, speech recognizer 125 may be implemented as a Hidden Markov Model (HMM) recognizer.

Speech recognition systems translate voice signals into text: however, speaker-independent speech recognition systems are generally rigid, inaccurate, computationally-intensive, and are not able to recognize true natural language. For example, typical speech recognition systems have a voice-to-text translation accuracy rate of 40%-50% when processing true natural language voice signals. It is difficult to design a highly accurate natural language speech recognition system that generates unconstrained voice-to-text translation in realtime, due to the complexity of natural language, the complexity of the language models used in speech recognition, and the limits on computational power.

In many applications, the exact text of a speech message is unimportant, and only the topic of the speech message needs to be recognized. It would be desirable to have a flexible, efficient, and accurate speech classification system that categorizes natural language speech based upon the topics comprising a speech message. In other words, it would be advantageous to implement a speech classification system that categorizes speech based upon what is talked about, without generating an exact transcript of what is said.

SUMMARY OF THE INVENTION

In accordance with the present invention, a system and method are disclosed for classifying a voice signal to a category from a set of predefined categories, based upon a statistical analysis of features extracted from the voice signal. The system includes an acoustic processor that generates a feature vector and an associated integer label for each frame of the voice signal, a memory for storing statistical characterizations of a set of predefined categories and agents associated with each predefined category, and a classifier for classifying the voice signal to a predefined category based upon a statistical analysis of the received output of the acoustic processor.

In one embodiment the acoustic processor includes an FFT for generating a spectral representation from the voice signal, a feature extractor for generating feature vectors characterizing the voice signal, a vector quantizer for quantizing the feature vectors and generating an integer label for each feature vector, and a register for storing the integer labels.

The classifier computes a probability of occurrence for the output of the acoustic processor based on each of the statistical characterizations of the predefined categories, and classifies the voice signal to the predefined category with the highest probability or to a set of predefined categories with the highest probabilities. Furthermore, the classifier accesses memory to determine an agent associated with the predefined category or categories and routes a caller associated with the voice signal to the agent. The agent may be a human agent or a software agent.

DETAILED DESCRIPTION OF THE INVENTION

The present invention classifies a voice signal based on statistical regularities in the signal. The invention analyzes the statistical regularities in the voice signal to determine a classification category. In one embodiment, the voice signal classification system of the invention applies digital signal processing techniques to a voice signal. The system receives the voice signal and computes a set of quantized feature vectors that represents the statistical characteristics of the voice signal. The system then analyzes the feature vectors and classifies the voice signal to a predefined category from a plurality of predefined categories. Finally, the system contacts an agent associated with the predefined category. The agent may be a person or an automated process that provides additional services to a caller.

Figure 1:
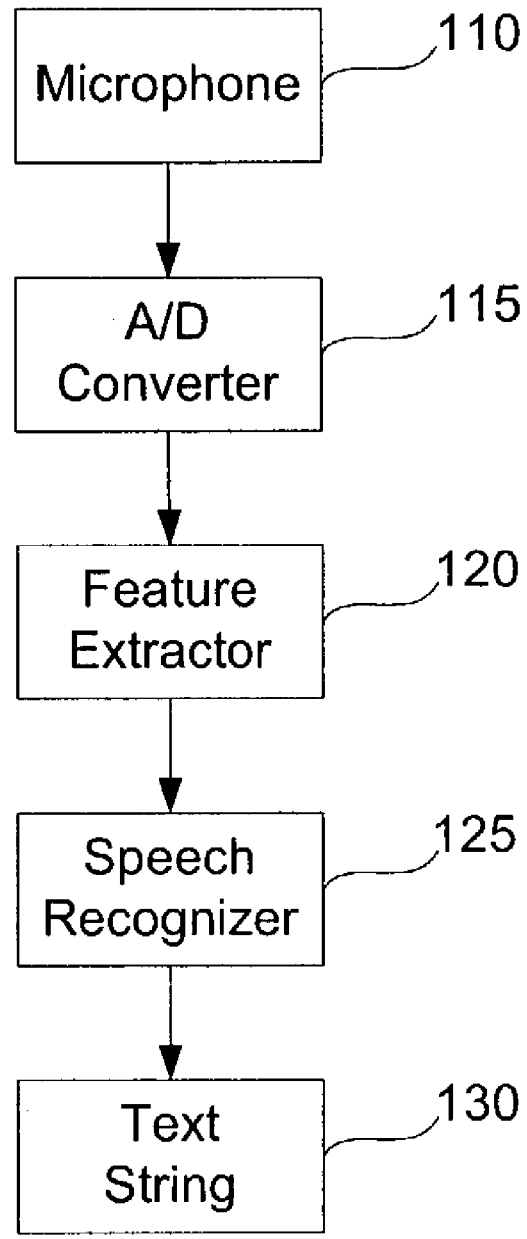
FIG. 1 is block diagram of a speech recognition system of the prior art.
Figure 2:
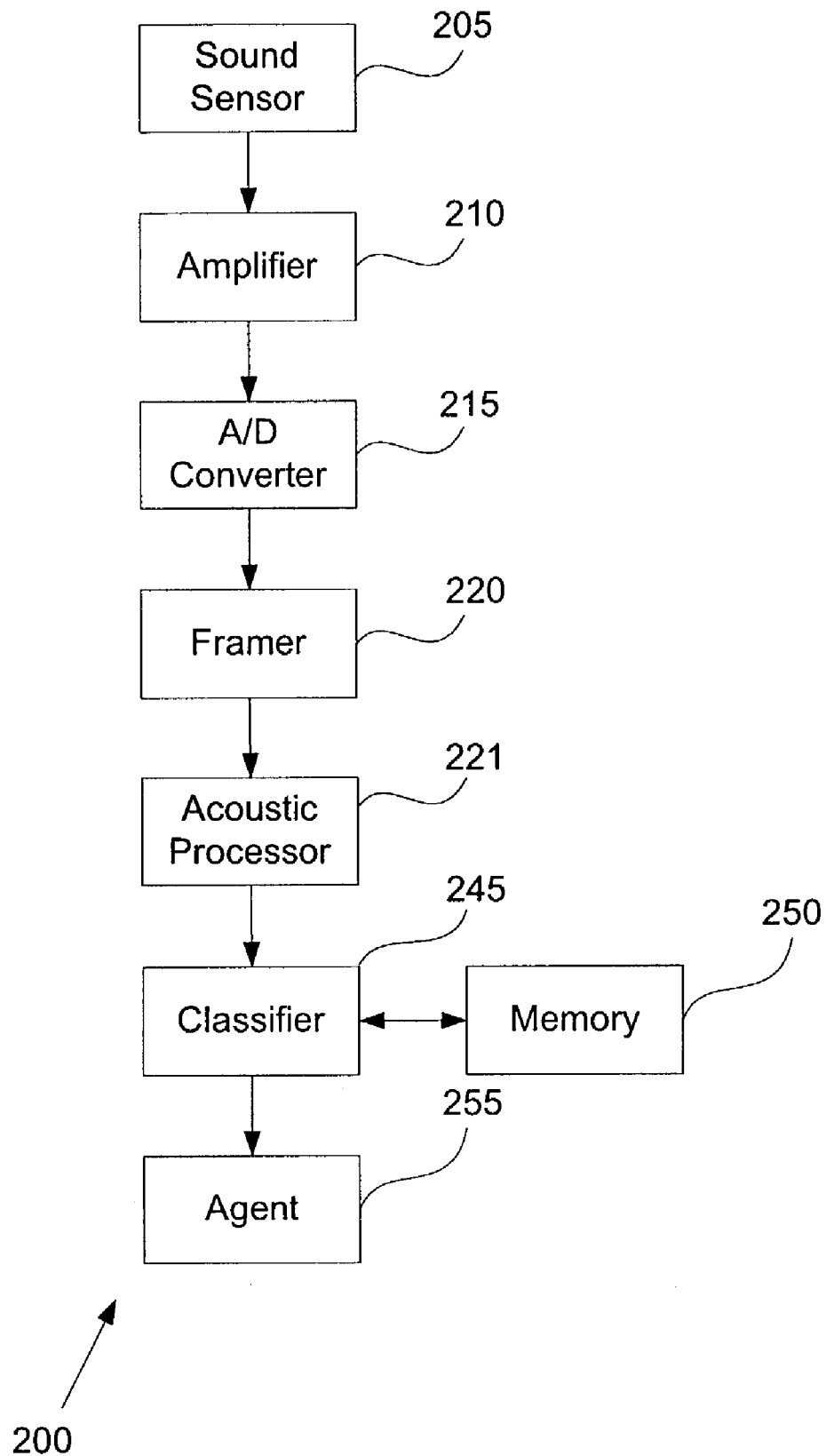
FIG. 2 is a block diagram of one embodiment of a voice signal classification system, according to the present invention.

FIG. 2 is a block diagram of one embodiment of a voice signal classification system 200, according to the invention. Voice classification system 200 includes a sound sensor 205, an amplifier 210, an A/D converter 215, a framer 220, an acoustic processor 221, a classifier 245, a memory 250, and an agent 255. System 200 may also include noise-reduction filters incorporated in A/D converter 215, acoustic processor 221, or as separate functional units. Sound sensor 205 detects sound energy and converts the detected sound energy into an electronic analog voice signal. In one embodiment, sound energy is input to system 200 by a speaker via a telephone call. Sound sensor 205 sends the analog voice signal to amplifier 210. Amplifier 210 amplifies the analog voice signal and sends the amplified analog voice signal to A/D converter 215. A/D converter 215 converts the amplified analog voice signal into a digital voice signal by sampling and quantizing the amplified analog voice signal. A/D converter 215 then sends the digital voice signal to framer 220.

Framer 220 segments the digital voice signal into successive data units called frames, where each frame occupies a time window of duration time T. A frame generally includes several hundred digital voice signal samples with a typical duration time T of ten, fifteen, or twenty milliseconds. However, the scope of the invention includes frames of any duration time T and any number of signal samples. Framer 220 sends the frames to acoustic processor 221. Sound sensor 205, amplifier 210, A/D converter 215, and framer 220 are collectively referred to as an acoustic front end to acoustic processor 221. The scope of the invention covers other acoustic front ends configured to receive a voice signal, and generate a digital discrete-time representation of the voice signal.

Acoustic processor 221 generates a feature vector and an associated integer label for each frame of the voice signal based upon statistical features of the voice signal. Acoustic processor 221 is described below in conjunction with FIG. 3.

In one embodiment, classifier 245 classifies the voice signal to one of a set of predefined categories by performing a statistical analysis on the integer labels received from acoustic processor 221. In another embodiment of the invention, classifier 245 classifies the voice signal to one of the set of predefined categories by performing a statistical analysis on the feature vectors received from acoustic processor 221. Classifier 245 is not a speech recognition system that outputs a sequence of words. Classifier 245 classifies the voice signal to one of the set of predefined categories based upon the most likely content of the voice signal. Classifier 245 computes the probabilities that the voice signal belongs to each of a set of predefined categories based upon a statistical analysis of the integer labels generated by acoustic processor 221. Classifier 245 assigns the voice signal to the predefined category that produces the highest probability. Classifier 245, upon assigning the voice signal to one of the set of predefined categories, accesses memory 250 to determine which agent is associated with the predefined category. Classifier 245 then routes a caller associated with the voice signal to the appropriate agent 255. Agent 255 may be a human agent or a software agent.

Figure 3:
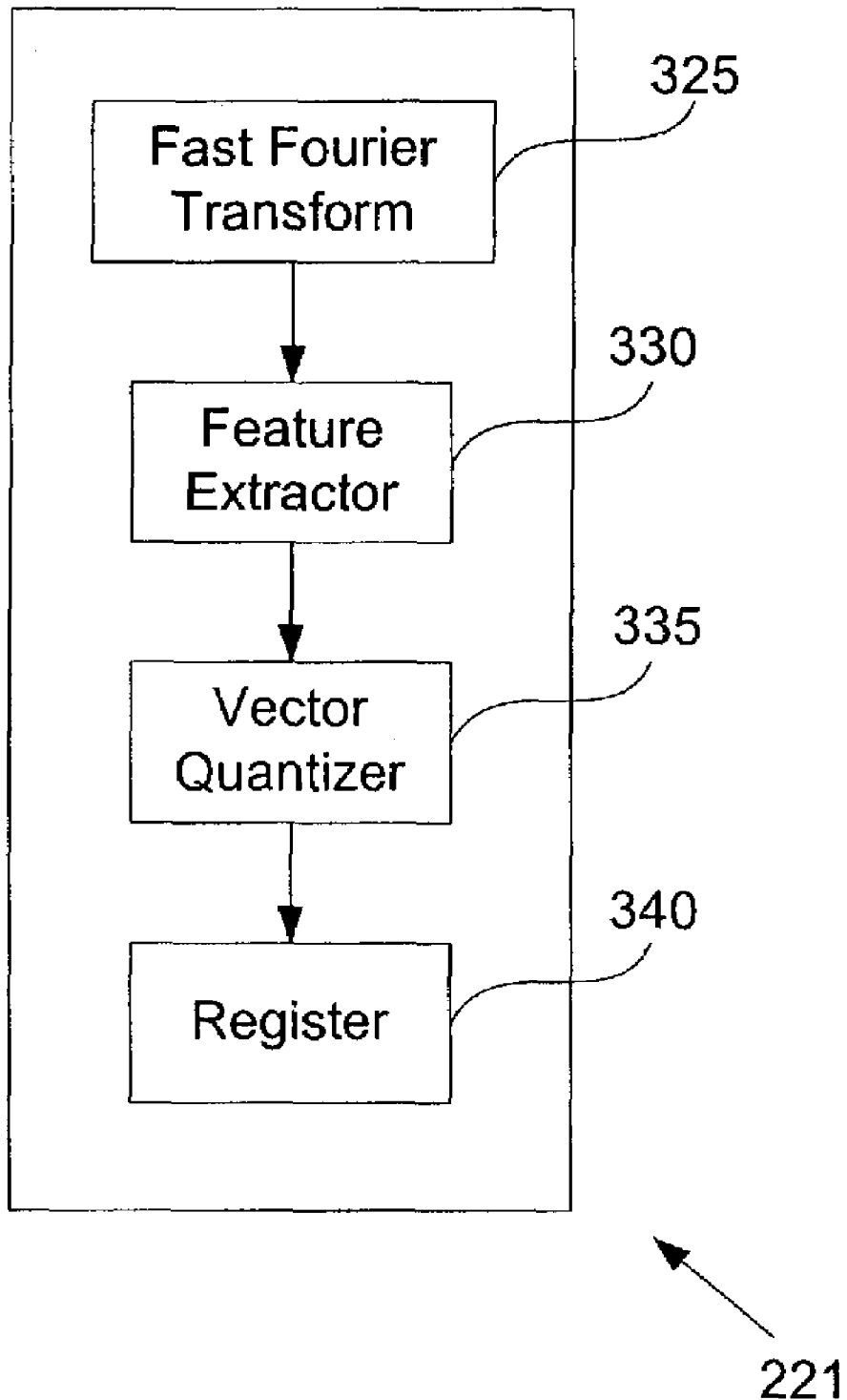
FIG. 3 is a block diagram of one embodiment of the acoustic processor of FIG. 2, according to the invention.

FIG. 3 is a block diagram of one embodiment of acoustic processor 221 of FIG. 2, according to the invention. However, the scope of the invention covers any acoustic processor that characterizes voice signals by extracting statistical features from the voice signals. In the FIG. 3 embodiment, acoustic processor 221 includes an FFT 325, a feature extractor 330, a vector quantizer 335, and a register 340. FFT 325 generates a spectral representation for each frame received from framer 220 by using a computationally efficient algorithm to compute the discrete Fourier transform of the voice signal. FFT 325 transforms the time-domain voice signal to the frequency-domain spectral representation to facilitate analysis of the voice signal by signal classification system 200. FFT 325 sends the spectral representation of each frame to feature extractor 330. Feature extractor 330 extracts statistical features of the voice signal and represents those statistical features by a feature vector, generating one feature vector for each frame. For example, feature extractor 330 may generate a smoothed version of the spectral representation called a Mel spectrum. The statistical features are identified by the relative energy in the Mel spectrum coefficients. Feature extractor 330 then computes the feature vector whose components are the Mel spectrum coefficients. Typically the components of the feature vector are cepstral coefficients, which feature extractor 330 computes from the Mel spectrum. All other techniques for extracting statistical features from the voice signal and processing the statistical features to generate feature vectors are within the scope of the invention. Feature extractor 330 sends the feature vectors to vector quantizer 335. Vector quantizer 335 quantizes the feature vectors and assigns each quantized vector one integer label from a set of predefined integer labels.

In an exemplary embodiment, vector quantizer 335 snaps components of an n-dimensional feature vector to the nearest quantized components of an n-dimensional quantized feature vector. Typically there are a finite number of different quantized feature vectors that can be enumerated by integers. Once the components of the feature vectors are quantized, vector quantizer 335 generates a single scalar value for each quantized feature vector corresponding to a unique integer label of this vector among all different quantized feature vectors. For example, given a quantized n-dimensional feature vector v with quantized components $(a_1, a_2, a_3, \ldots, a_n)$, a scalar value (SV) may be generated by a function $SV=f(a_1, a_2, a_3, \ldots, a_n)$, where SV is equal to a function f of the quantized components $(a_1, a_2, a_3, \ldots, a_n)$. Vector quantizer 335 then assigns an integer label from the set of predefined integer labels to each computed SV.

Vector quantizer 335 sends the integer labels to register 340, which stores the labels for all frames in the voice signal. Register 340 may alternatively comprise a memory of various storage-device configurations, for example Random-Access Memory (RAM) and non-volatile storage devices such as floppy-disks or hard disk-drives. Once the entire sequence of integer labels that represents the voice signal is stored in register 340, register 340 sends the entire sequence of integer labels to classifier 245.

In alternate embodiments, acoustic processor 221 may functionally combine FFT 325 with feature extractor 330, or may not include FFT 325. If acoustic processor 221 does not perform an explicit FFT on the voice signal at any stage, acoustic processor 221 may use indirect methods known in the art for extracting statistical features from the voice signal. For example, in the absence of FFT 325, feature extractor 330 may generate an LPC spectrum directly from the time domain representation of the signal. The statistical features are identified by spectral peaks in the LPC spectrum and are represented by a set of LPC coefficients. Then, in one embodiment, feature extractor 330 computes the feature vector whose components are the LPC coefficients. In another embodiment, feature extractor 330 computes the feature vector whose components are cepstral coefficients, which feature extractor 330 computes from the LPC coefficients by taking a fast Fourier transform of the LPC spectrum.

Figure 4A:
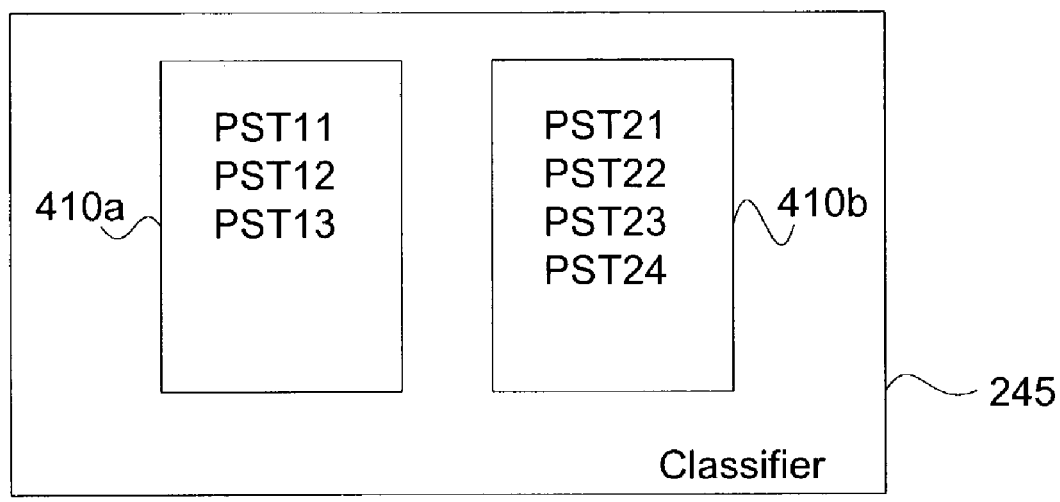
FIG. 4A is a block diagram of one embodiment of the classifier of FIG. 2, according to the invention.

FIG. 4A is a block diagram of one embodiment of classifier 245 of FIG. 2, according to the invention. Classifier 245 includes one or more probabilistic suffix trees (PSTs) grouped together by voice classification category 410. For example, category 1 410a may be "pets" and includes PST11, PST12, and PST13. Category 2 410b may be "automobile parts" and includes PST21, PST22, PST23, and PST24. Any number and type of voice classification categories 410 and any number of PSTs per category are within the scope of the invention.

Figure 4B:
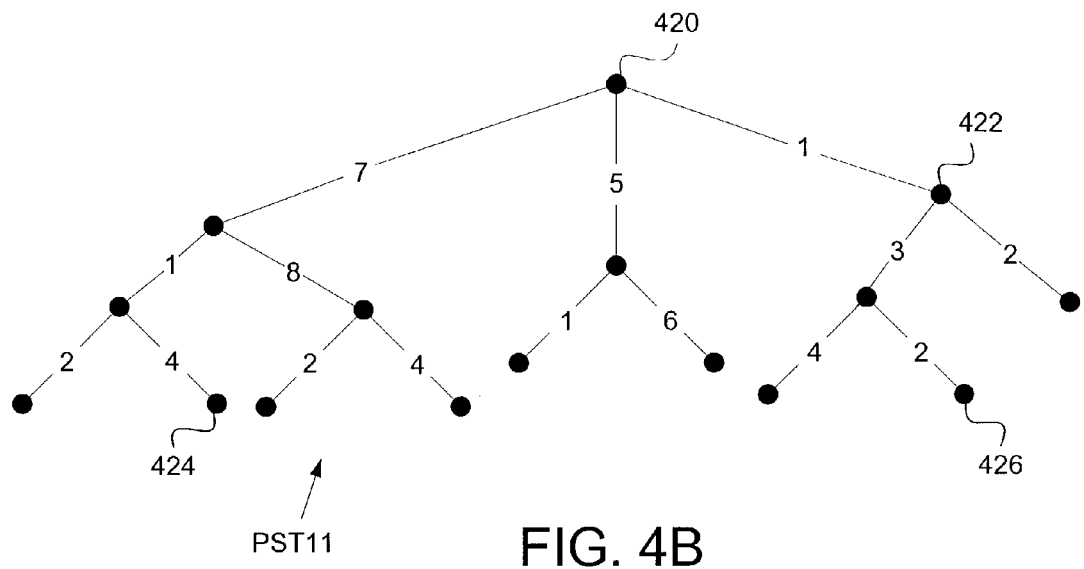
FIG. 4B is a block diagram of one embodiment of probabilistic suffix tree PST11 of FIG. 4A, according to the invention.
Figure 4C:
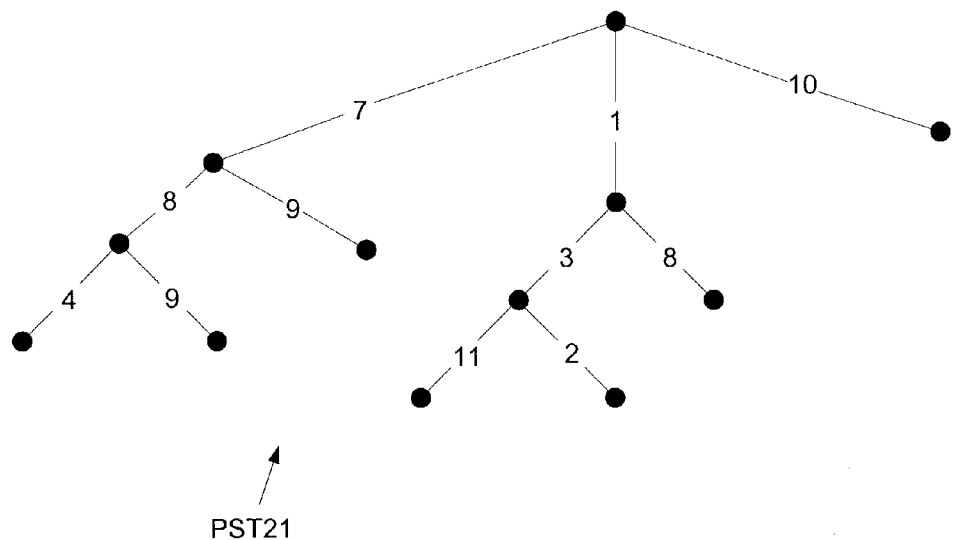
FIG. 4C is a block diagram of one embodiment of probabilistic suffix tree PST21 of FIG. 4A, according to the invention.

FIG. 4B is a block diagram of one embodiment of PST11 from category 1 410a and FIG. 4C is a block diagram of one embodiment of PST21 from category 2 410b. The message information stored in register 340 (FIG. 3) can be considered as a string of integer labels. For each position in this string, a suffix is a contiguous set of integer labels that terminates at that position. Suffix trees are data structures comprising a plurality of suffixes for a given string, allowing problems on strings, such as substring matching, to be solved efficiently and quickly. A PST is a suffix tree in which each vertex is assigned a probability. Each PST has a root vertex and a plurality of branches. A path along each branch comprises one or more substrings, and the substrings in combination along a specific branch define a particular suffix.

For example, PST11 of FIG. 4B includes 9 suffixes represented by 9 branches, where a substring of each branch is defined by an integer label. For example, a 7-1-2 sequence of integer labels along a first branch defines a first suffix, a 7-1-4 sequence of integer labels along a second branch defines a second suffix, a 7-8-2 sequence of integer labels along a third branch defines a third suffix, and a 7-8-4 sequence of integer labels along a fourth branch defines a fourth suffix. In one embodiment, a probability is assigned to each vertex of each PST in each category 410, based upon suffix usage statistics in each category 410. For example, suffixes specified by the PSTs of category 1 410a (FIG. 4A) common to words typically used to describe "pets" are assigned higher probabilities than suffixes used less frequently. In addition, a probability assigned to a given suffix from category 1 410a is typically different than a probability assigned to the given suffix from category 2 410b (FIG. 4A).

In one embodiment, the PSTs associated with each voice classification category 410 are built from training sets. The training sets for each category include voice data from a variety of users such that the PSTs are built using a variety of pronunciations, inflections, and other criteria.

In operation, classifier 245 receives a sequence of integer labels from acoustic processor 221 associated with a voice message. Classifier 245 computes the probability of occurrence of the sequence of integer labels in each category using the PSTs. In one embodiment, classifier 245 determines a total probability for the sequence of integer labels for each PST in each category. Classifier 245 determines the total probability for a sequence of integer labels applied to a PST by determining a probability at each position in the sequence based on the longest suffix present in that PST, then calculating the product of the probabilities at each position. Classifier 245 then determines which category includes the PST that produced the highest total probability, and assigns the message to that category.

Using PST11 of FIG. 4B and a sequence of integer labels 4-1-7-2-3-1-10 as an example, classifier 245 determines the probability of a longest suffix at each of the seven locations in the integer label sequence. Classifier 245 reads the first location in the sequence of integer labels as the integer label 4. Since the integer label 4 is not associated with a branch labeled 4 that originates from a root vertex 420 of PST11, classifier 245 assigns a probability of root vertex 420 (e.g., 1) to the first location. The second location in the sequence of integer labels is the integer label 1. The longest suffix associated with the second location that is also represented by a branch originating from root vertex 420 is the suffix corresponding to the integer label 1, since the longest suffix corresponding to the integer label sequence 1-4 does not correspond to any branches similarly labeled originating from root vertex 420. That is, PST11 does not have a branch labeled 1-4 that originates from root vertex 420. Therefore, classifier 245 assigns the probability defined at a vertex 422 (P(1)) to the second location. The third location in the sequence of integer labels is the integer label 7. Since the longest suffix ending at the integer label 7 (i.e., suffix 7-1-4) exists in PST11 as the branch labeled 7-1-4 originating from root vertex 420, classifier 245 assigns a probability associated with a vertex 424 (P(7-1-4)) to the third location. The next two locations in the sequence of integer labels correspond to the integers 2 and 3, respectively, and are not associated with any similarly labeled branches the originate from root vertex 420, and therefore classifier 245 assigns the probability of root vertex 420 to these next two locations. The sixth location in the sequence corresponds to the integer label 1, and the longest suffix ending at the sixth location that is represented by a branch in PST11 is the suffix 1-3-2. Therefore, classifier 245 assigns a probability associated with a vertex 426 (P(1-3-2)) to the sixth location along the sequence. Next, since the seventh location corresponding to the integer label 10 is not represented by a branch in PST11 originating from root vertex 420, classifier 245 assigns the probability of root vertex 420 to the seventh location in the sequence.

Next, classifier 245 calculates the total probability for the sequence of integer labels 4-1-7-2-3-1-10 applied to PST11 where the total probability is a product of the location probabilities: $P_T(PST11)=1\times P(1)\times P(7-1-4)\times 1\times 1\times P(1-3-2)\times 1$. In another embodiment of the invention, classifier 245 calculates the total probability by summing the logarithm of each location probability. Although the sequence of integer labels for this examples includes only seven integer labels, any number of integer labels is within the scope of the invention. The number of integer labels in the sequence depends on the number of frames of the message, which in turn depends on the duration of the voice signal input to system 200.

Figure 5:
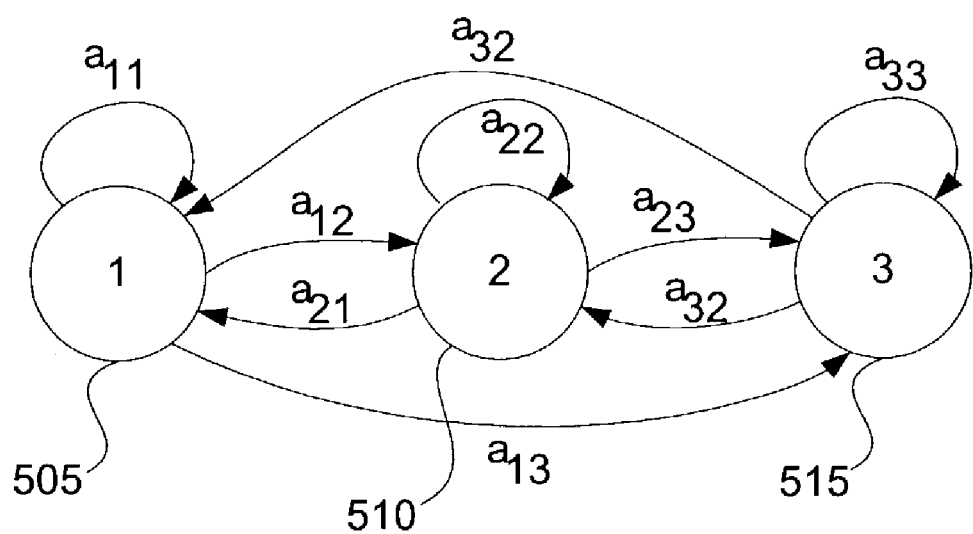
FIG. 5 is a block diagram of another embodiment of the classifier of FIG. 2, according to the invention.

FIG. 5 is a block diagram of another embodiment of classifier 245, according to the invention. The FIG. 5 embodiment of classifier 245 includes three states and nine arcs, but the scope of the invention includes classifiers with any number of states and associated arcs. Since each state is associated with one of the predefined integer labels, the number of states is equal to the number of predefined integer labels. The FIG. 5 embodiment of classifier 245 comprises three predefined integer labels, where state 1 (505) is identified with integer label 1, state 2 (510) is identified with integer label 2, and state 3 (515) is identified with integer label 3. The arcs represent the probability of a transition from one state to another state or the same state. For example, $a_{12}$ is the probability of transition from state 1 (505) to state 2 (510), $a_{21}$ is the probability of transition from state 2 (510) to state 1 (505), and $a_{11}$ is the probability of transition from state 1 (505) to state 1 (505). The transition probabilities $a_{ij}(L)$ depend on the integer labels L of the quantized speech.

In the FIG. 5 embodiment, classifier 245 computes all permutations of the integer labels received from acoustic processor 221 and computes a probability of occurrence for each permutation. Classifier 245 associates each permutation of the received integer labels to a unique sequence of states. The total number of sequences that classifier 245 can compute is the total number of predefined integer labels raised to an integer power, where the integer power is the total number of integer labels sent to classifier 245. If m=the total number of predefined integer labels, n=the integer power, and ns=the total number of sequences of states, then ns=$m^n$. Classifier 245 comprises three predefined integer labels (m=3). Thus, if register 340 sends classifier 245 three integer labels (n=3), then classifier can compute $3^3$=27 possible sequences of states. The sequences of states includes, for example, 1→1→1, 1→1→2, 1→2→1, 1→1→3, 1→3→1, 1→2→1, 1→2→2, 1→3→3, and 1→2→3. The total number of transition probabilities is the total number of predefined integer labels squared. If np=total number of transition probabilities, then np=$m^2$. Thus there are $3^2$=9 transition probabilities. For each integer label L that can be assigned by quantizer 335 (FIG. 3), there is possibly a different set of transition probabilities. The transition probabilities are $a_{11}(L)$, $a_{22}(L)$, $a_{33}(L)$, $a_{12}(L)$, $a_{21}(L)$, $a_{13}(L)$, $a_{31}(L)$, $a_{23}(L)$, and $a_{32}(L)$.

When a user or system administrator initializes voice signal classification system 200, classifier 245 assigns an initial starting probability to each state. For example, classifier 245 assigns to state 1 (505) a probability $a_{i1}$, which represents the probability of starting in state 1, to state 2 (510) a probability $a_{i2}$, which represents the probability of starting in state 2, and to state 3 (515) a probability $a_{i3}$, which represents the probability of starting in state 3.

If classifier 245 receives integer labels (1,2,3), then classifier 245 computes six sequences of states 1→2→3, 1→3→2, 2→1→3, 2→3→1, 3→1→2, and 3→2→1, and an associated probability of occurrence for each sequence. The six sequences of states are a subset of the 27 possible sequences of states. For example, classifier 245 computes the total probability of the 1→2→3 sequence of states by multiplying the probability of starting in state 1, $a_{i1}$, by the probability $a_{12}(L_1)$ of a transition from state 1 to state 2 when the first integer label of a sequence of integer labels appears, by the probability $a_{23}(L_2)$ of a transition from state 2 to state 3 when the second integer label of the sequence appears. The total probability is P(1→2→3)=$a_{i1} \times a_{12}(L_1) \times a_{23}(L_2)$. Similarly, the total probability of the 2→3→1 sequence of states is P(2→3→1)=$a_{i2} \times a_{23}(L_1) \times a_{31}(L_2)$. Classifier 245 calculates the total probabilities for the remaining four sequences of states in a similar manner. Classifier 245 then classifies the voice signal to one of a set of predefined categories associated with the sequence of states with the highest probability of occurrence. Some of the sequences of states may not have associated categories, and some of the sequences of states may have the same associated category. If there is no predefined category associated with the sequence of states with the highest probability of occurrence, then classifier 245 classifies the voice signal to a predefined category associated with the sequence of states with the next highest probability of occurrence.

Voice classification system 200 may be implemented in a voice message routing system, a quality-control call center, an interface to a Web-based voice portal, or in conjunction with a speech-to-text recognition engine, for example. A retail store may use voice signal classification system 200 to route telephone calls to an appropriate department (agent) based upon a category to which a voice signal is classified. For example, a person may call the retail store to inquire whether the store sells a particular brand of cat food. More specifically, a person may say the following: "I was wondering if you carry, . . . uh, . . . well, if you stock or have in store cat food X, well actually cat food for my kitten, and if so, could you tell me the price of a bag. Also, how large of bag can I buy? (Pause). Oh wait, I almost forgot, do you have monkey chow?" Although this is a complex, natural language speech pattern, voice signal classification system 200 classifies the received natural language voice signal into a category based upon the content of the voice signal. For example, system 200 may classify the voice signal to a pet department category, and therefore route the person's call to the pet department (agent). However, in addition, system 200 may classify the speech into other categories, such as billing, accounting, employment opportunities, deliveries, or others. For example, system 200 may classify the speech to a pricing category that routes the call to an associated agent that can immediately answer the caller's questions concerning inventory pricing.

System 200 may classify voice signals to categories associated with predefined items on a menu. For example, a voice signal may be classified to a category associated with a software agent that activates a playback of a predefined pet department menu. The caller can respond to the pet department menu with additional voice messages or a touch-tone keypad response. Or the voice signal may be classified to another category whose associated software agent activates a playback of a predefined pricing menu.

In another embodiment, system 200 may be implemented in a quality control call center that classifies calls into complaint categories, order categories, or personal call categories, for example. An agent then selects calls from the various categories based upon the agent's priorities at the time. Thus, system 200 provides an effective and efficient manner of customer-service quality control.

In yet another embodiment of speech classification system 200, system 200 may be configured as an interface to voice portals, classifying calls to various categories such as weather, stock, or traffic, and then routing and connecting the call to an appropriate voice portal.

In yet another embodiment of the present invention, system 200 is used in conjunction with a speech-to-text recognition engine. For example, a voice signal is assigned to a particular category that is associated with a predefined speech model including a defined vocabulary set for use in the recognition engine. For instance, a caller inquiring about current weather conditions in Oklahoma City would access the recognition engine with a speech model/vocabulary set including voice-to-text translations for words such as "storm", "rain", "hail", and "tornado." The association of speech models/vocabulary sets with each voice signal category reduces the complexity of the speech-to-text recognition engine and consequently reduces speech-to-text processing times.

The combination of system 200 with the speech-to-text recognition engine may classify voice signals into language categories, thus making the combination of system 200 and the speech-to-text recognition engine language independent. For example, if voice classification system 200 classifies a voice signal to a German language category, then the recognition engine uses a speech model/vocabulary set associated with the German language category to translate the voice signal.

In other embodiments, system 200 may be implemented to classify voice signals into categories that are independent of the specific spoken words or text of the call. For example, system 200 may be configured to categorize a caller as male or female as the content of a male voice signal typically is distinguishable from the content of a female voice signal. Similarly, system 200 may be configured to identify a caller as being one member of a predetermined group of persons as the content of the voice signal of each person in the group would be distinguishable from that of the other members of the group. System 200 therefore may be used, for example, in a caller identification capacity or a password protection or other security capacity.

In addition, just as system 200 may be used to categorize voice signals as either male or female, system 200 may be used to distinguish between any voice signal sources where the voice signals at issue are known to have different content. Such voice signals are not required to be expressed in a known language. For example, system 200 may be used to distinguish between various types of animals, such as cats and dogs or sheep and cows. Further, system 200 may be used to distinguish among different animals of the same type, such as dogs, where a predetermined group of such animals exists and the voice signal content of each animal in the group is known. In this case, system 200 may be used to identify any one of the animals in the group in much the same way that system 200 may be used to identify a caller as described above.

Figure 6:
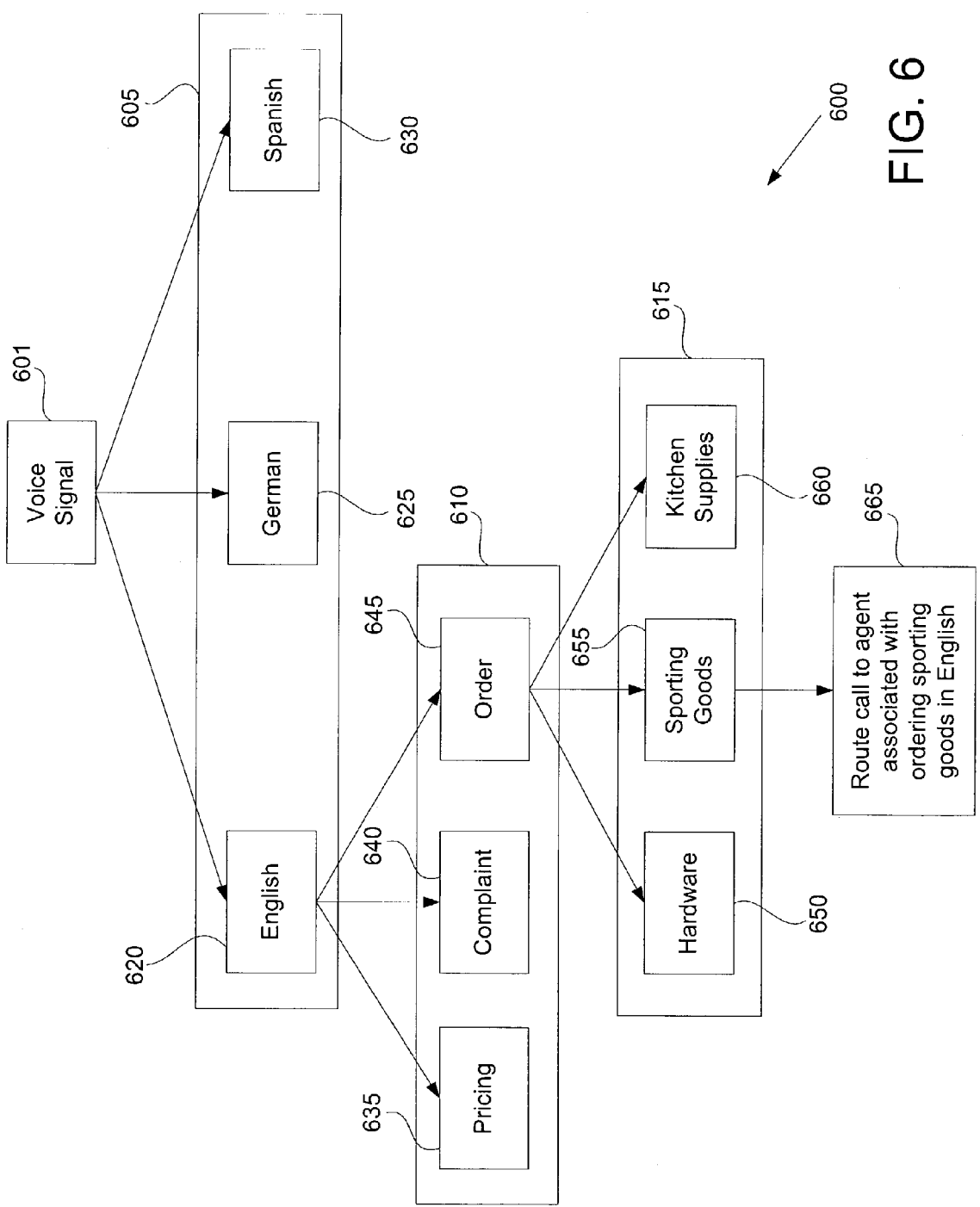
FIG. 6 is a block diagram of one embodiment of a hierarchical structure of classes, according to the invention.

Voice classification system 200 may be implemented in a hierarchical classification system. FIG. 6 is a block diagram of one embodiment of a hierarchical structure of classes 600, according to the invention. The hierarchical structure includes a first level class 605, a second level class 610, and a third level class 615. In the FIG. 6 exemplary embodiment of the hierarchical structure of classes 600, the first level class 605 includes language categories, such as an English language category 620, a German language category 625, and a Spanish language category 630. The second level class 610 includes a pricing category 635, a complaint category 640, and an order category 645. The third level class 615 includes a hardware category 650, a sporting goods category 655, and a kitchen supplies category 660.

For example, voice classification system 200 receives a call and classifies the caller's voice signal 601 into English category 620, then classifies voice signal 601 into order 645 subcategory, and then classifies voice signal 601 into sporting goods 655 sub-subcategory. Finally, system 200 routes the call to an agent 665 associated with ordering sporting goods supplies in English. The configuration of system 200 with the hierarchical structure of classes 600 permits more flexibility and refinement in classifying voice signals to categories. The scope of the present invention includes any number of class levels and any number of categories in each class level.

Figure 7:
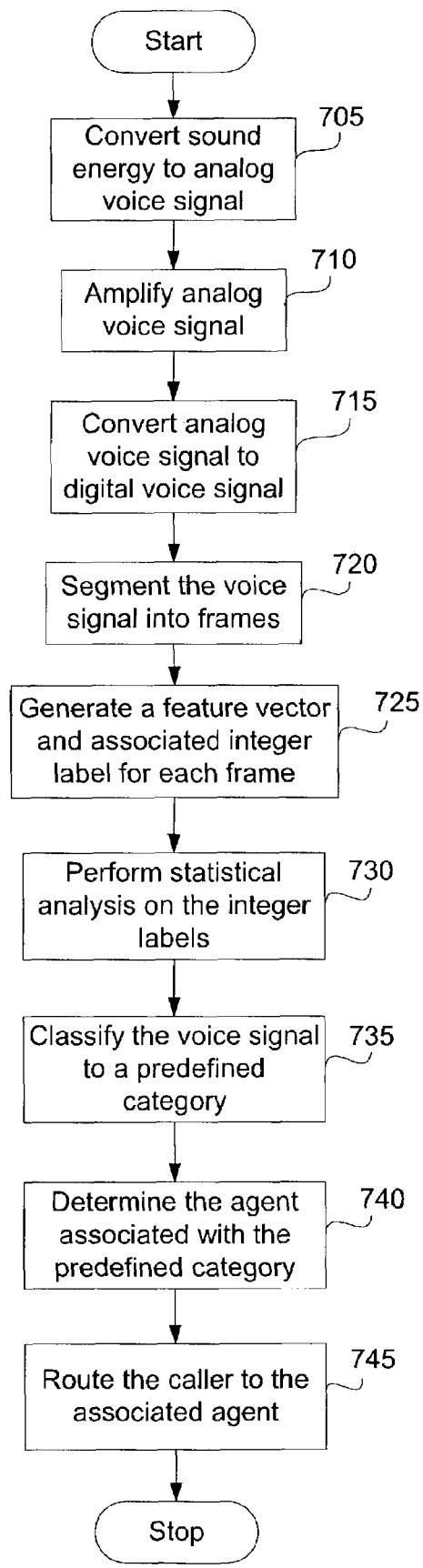
FIG. 7 is a flowchart of method steps for classifying speech, according to one embodiment of the invention.

FIG. 7 is a flowchart of method steps for classifying speech, according to one embodiment of the invention. Although the steps of FIG. 7 method are described in the context of system 200 of FIG. 2, any other system configured to implement the method steps is within the scope of the invention. In a step 705, sound sensor 205 detects sound energy and converts the sound energy into an analog voice signal. In a step 710, amplifier 210 amplifies the analog voice signal. In a step 715, A/D converter 215 converts the amplified analog voice signal into a digital voice signal. In a step 720, framer 220 segments the digital voice signal into successive data units called frames. In a step 725, acoustic processor 221 processes the frames and generates a feature vector and an associated integer label for each frame. Typically, acoustic processor 221 extracts features (such as statistical features) from each frame, processes the extracted features to generate feature vectors, and assigns an integer label to each feature vector. Acoustic processor 221 may include one or more of the following: an FFT 325, a feature extractor 330, a vector quantizer 335, and a register 340. In a step 730, classifier 245 performs a statistical analysis on the integer labels and in a step 735, classifier 245 classifies the voice signal to a predefined category based upon the results of the statistical analysis. In a step 740, classifier 245 accesses memory 250 to determine which agent 255 is associated with the predefined category assigned to the voice signal. The agent may either be a human agent or a software agent. In a step 745, a caller associated with the voice signal is routed to the agent corresponding to the predefined category.

The invention has been explained above with reference to specific embodiments. Other embodiments will be apparent to those skilled in the art in light of this disclosure. The present invention may readily be implemented using configurations other than those described in the embodiments above. Therefore, these and other variations upon the specific embodiments are intended to be covered by the present invention, which is limited only by the appended claims.

What is claimed is:

1. A system for classifying a voice signal, comprising:
    an acoustic processor configured to receive the voice signal, to generate feature vectors that characterize the voice signal, and to assign an integer label to each generated feature vector; and
    a classifier coupled to the acoustic processor to classify the voice signal to one of a set of predefined categories based upon a statistical analysis of the integer labels associated with the feature vectors, wherein the classifier uses one or more probability suffix trees (PSTs) to compute a probability of occurrence of the integer labels being classified in the set of predefined categories.

2. The system of claim 1, wherein the system further comprises a framer configured to segment the voice signal into frames.

3. The system of claim 1, wherein the acoustic processor comprises a feature extractor configured to extract statistical features characteristic of the voice signal.

4. The system of claim 1, further comprising a memory for storing identities of agents, each agent being associated with one of the set of predefined categories.

5. The system of claim 1, wherein the classifier computes a probability that the voice signal belongs to each of the set of predefined categories using the integer labels assigned to the feature vectors.

6. The system of claim 5, wherein the classifier classifies the voice signal to the predefined category in the set of predefined categories that is associated with the highest probability.

7. The system of claim 1, wherein the classifier routes a caller associated with the voice signal to an agent associated with the predefined category.

8. A method for classifying a voice signal, comprising the steps of:
    generating a digital discrete-time representation of the voice signal;
    generating feature vectors from the digital discrete-time representation;
    assigning an integer label to each feature vector; and
    classifying the voice signal to one of a set of predefined categories based upon a statistical analysis of the integer labels, wherein the classifying step uses one or more probability suffix trees (PSTs) to compute a probability of occurrence of the integer labels being classified in the set of predefined categories.

9. The method of claim 8, further comprising the step of segmenting the voice signal into frames.

10. The method of claim 8, wherein the step of generating feature vectors from the digital discrete-time representation further comprises the step of extracting statistical features that characterize the voice signal.

11. The method of claim 8, wherein the step of classifying the voice signal further comprises the step of computing a probability that the voice signal belongs to each of the set of predefined categories using the integer labels.

12. The method of claim 11, wherein the step of classifying the voice signal further comprises classifying the voice signal to the predefined category in the set of predefined categories that is associated with the highest probability.

13. The method of claim 8, further comprising the steps of:
associating an agent with each predefined category; and
routing a caller associated with the voice signal to the agent associated with the one of the set of predefined categories.

14. A method for classifying a voice signal, comprising the steps of:
generating a digital discrete-time representation of the voice signal;
segmenting the digital discrete-time representation of the voice signal into frames;
extracting statistical features from each frame that characterize the voice signal;
generating a feature vector from each frame using the extracted statistical features;
assigning an integer label to each feature vector; and
classifying the voice signal to one of a set of predefined categories based upon a statistical analysis of the integer labels, wherein the classifying step uses one or more probability suffix trees (PSTs) to compute a probability of occurrence of the integer labels being classified in the set of predefined categories.

15. A system for classifying a voice signal, comprising:
means for generating a digital discrete-time representation of the voice signal;
means for segmenting the digital discrete-time representation of the voice signal into frames;
means for extracting statistical features from each frame that characterize the voice signal;
means for generating a feature vector from each frame using the extracted statistical features;
means for associating an integer label to each feature vector; and
means for classifying the voice signal to one of a set of predefined categories based upon a statistical analysis of the integer labels, wherein the means for classifying uses one or more probability suffix trees (PSTs) to compute a probability of occurrence of the integer labels being classified in the set of predefined categories.

* * * * *